(12) United States Patent
Kanayama et al.

(10) Patent No.: US 7,046,309 B2
(45) Date of Patent: May 16, 2006

(54) SINGLE PANEL TYPE VIDEO DISPLAY

(75) Inventors: Hideyuki Kanayama, Kyoto (JP); Kazuhiro Arai, Osaka (JP); Koji Ishii, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 425 days.

(21) Appl. No.: 10/298,572

(22) Filed: Nov. 19, 2002

(65) Prior Publication Data

US 2003/0095213 A1    May 22, 2003

(30) Foreign Application Priority Data

Nov. 19, 2001    (JP)    ............................. 2001/352616

(51) Int. Cl.
   *H04N 9/12*    (2006.01)
   *H04N 9/31*    (2006.01)

(52) U.S. Cl. ...................................... 348/742; 348/760

(58) Field of Classification Search ................ 348/742, 348/743, 759, 760; 359/634; 353/32–34, 353/98; 349/5, 8, 9, 95; H04N 9/12, 5/74, H04N 9/31
   See application file for complete search history.

(56) References Cited

U.S. PATENT DOCUMENTS

| | | | | |
|---|---|---|---|---|
| 5,276,523 A | * | 1/1994 | Kurematsu et al. | ......... 348/745 |
| 5,404,234 A | * | 4/1995 | Taniguchi et al. | ............. 358/15 |
| 5,428,463 A | * | 6/1995 | Goto | ........................ 358/482 |
| 6,020,940 A | * | 2/2000 | Ishikawa et al. | ............... 349/8 |
| 6,139,156 A | * | 10/2000 | Okamori et al. | ............ 353/98 |
| 6,219,110 B1 | * | 4/2001 | Ishikawa et al. | ........... 348/759 |

FOREIGN PATENT DOCUMENTS

| | | |
|---|---|---|
| JP | 10-206813 | 8/1998 |
| JP | 11-027686 | 1/1999 |
| JP | 11-142780 | 5/1999 |
| JP | 2000-180962 A | 6/2000 |
| JP | 2001-051231 A | 2/2001 |
| JP | 2001-515609 A | 9/2001 |

* cited by examiner

*Primary Examiner*—Sherrie Hsia
(74) *Attorney, Agent, or Firm*—McDermott Will & Emery LLP

(57) ABSTRACT

There is provided a single panel type video display capable of increasing the luminance of image. A color separator separates light from a light source into light beams in three colors in a band shape to emit the light beams and introduces the band-shaped light beams in the three colors so as to be overlapped with one another in a predetermined region. A lens array wheel has a plurality of functional units each composed of a convex lens of a size corresponding to the predetermined region, circularly passes the plurality of functional units each composed of the convex lens through the predetermined region, and scrolls the band-shaped light beams in the three colors in a state where they are divided among regions on a single liquid crystal display panel. A video signal is fed to the liquid crystal display panel in synchronization with the movement of the plurality of functional units each composed of the convex lens.

10 Claims, 5 Drawing Sheets

SINGLE PANEL TYPE VIDEO DISPLAY

BACKGROUND OF THE INVENTION

Field of the Invention

The present invention relates to a single panel type video display for modulating light emitted from a light source by a single light valve to display color image.

A projector using a single panel type light valve has been conventionally known. Since the projector using the single panel type light valve comprises a single light valve, it can be miniaturized and reduced in cost, as compared with a projector comprising three light valves for red, green, and blue colors. In the conventional single panel type projector, there is a system comprising a color wheel with a color filter, for example, for coloring.

In the color wheel, the green and blue colors are reflected on a red transmission region filter, the red and blue colors are reflected on a green transmission region filter, and the red and green colors are reflected on a blue transmission region filter. Approximately two-thirds of the light from the light source is lost. Consequently, it is not easy to increase the luminance of image.

SUMMARY OF THE INVENTION

In view of the foregoing circumstances, an object of the present invention is to provide a single panel type video display capable of increasing the luminance of image.

In order to solve the above-mentioned problem, a single panel type video display according to the present invention is characterized by comprising color separation means for separating light from a light source into light beams in three colors in a band shape to emit the light beams and introducing the band-shaped light beams in the three colors so as to be overlapped with one another in a predetermined region; movable optical means having a plurality of convergent elements of a size corresponding to the predetermined region, circularly passing the convergent elements through the predetermined region, and scrolling the band-shaped light beams in the three colors in a state where they are divided among regions on a single light valve; video signal feed control means for controlling the feed of a video signal to the light valve in synchronization with the movement of the convergent elements; and image light enlargement projection means for projecting in enlarged fashion the image on the single light valve onto the screen.

In the above-mentioned configuration, the light from the light source is changed into the band-shaped light beams in the three colors and is introduced into the light valve. Accordingly, the utilization efficiency of the light from the light source is improved, thereby making it possible to increase the luminance of the image. The band-shaped light beams in the three colors are scrolled on the light valve by the movement of the convergent elements, and the feed of the video signal to the light valve is controlled in synchronization with the movement of the convergent elements. Therefore, color display is realized.

The color separation means may introduce the light passing through a rod prism provided in the position where the light from the light source is received.

Further, the rod prism may have a tapered shape so as to reduce the dispersion of the light.

The longitudinal length of a region into which the light is introduced on the color separation means may be approximately one-third the longitudinal length of the aspect ratio of the light valve.

The color separation means may be constructed by arranging in one direction two dichroic devices and one optical path change means.

The color separation means may comprise a cross type dichroic prism and two optical path change means.

The two optical path change means may have a reflection function of an angle other than 90° with respect to the optical axis of light reflected on the cross type dichroic prism to introduce the light into the predetermined region.

The movable optical means may comprise a lens array wheel constructed by arranging a plurality of functional units each composed of a convex lens in a disk shape along a circumferential direction, and driving means for rotating the lens array wheel.

The functional units each composed of the convex lens may be formed in the shape of a sector which narrows toward the center and have their straight line portions brought into contact with each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2(*a*) is a front view,

FIG. 2(*b*) is a side view, and

FIG. 2(*c*) is an enlarged view of a plurality of functional units each composed of a convex lens;

DESCRIPTION OF THE PREFERRED EMBODIMENTS

A single panel type liquid crystal projector according to an embodiment of the present invention will be described on the basis of FIGS. 1 to 4.

Figure 1:
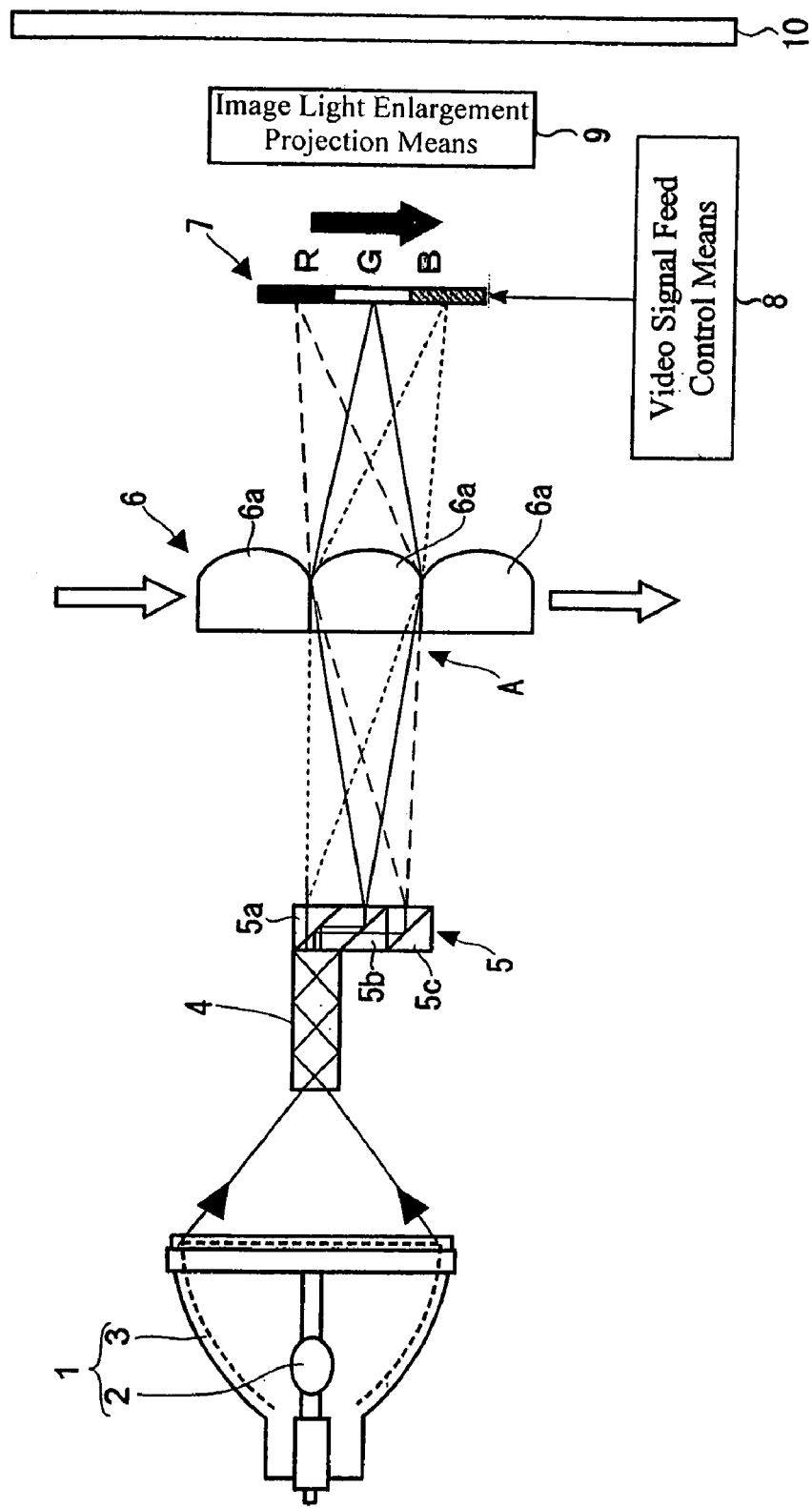
FIG. 1 is an explanatory view showing an optical system of a single panel type liquid crystal projector according to an embodiment of the present invention.

As shown in FIG. 1, a light emitter 2 in a light source 1 is composed of an ultra-high pressure mercury lamp, a metal halide lamp, a xenon lamp, or the like, for example. Light irradiated therefrom is reflected by an elliptical mirror 3, and the reflected light is supplied to an incidence surface of a rod prism 4 in a converged state. The light incident on the rod prism 4 repeats a total reflection function at an inner surface of the rod prism 4, to form a uniform surface light source at an emission surface of the rod prism 4. The light at the emission surface which has been thus integrated is introduced into a color separator 5 provided at the emission surface.

The color separator 5 is constructed by arranging in one direction a first dichroic prism 5*a*, a second dichroic prism 5*b*, and a prism 5*c* having a reflection function by an aluminum coating surface. The first dichroic prism 5*a* transmits a light beam in a blue wavelength band (a B light beam) in white light received from the rod prism 4, changes the respective directions of a light beam in a red wavelength band (a R light beam) and a light beam in a green wavelength band (an G light beam) by 90° by reflection function. The light beam in the blue wavelength band which has been transmitted through the first dichroic prism 5*a* reaches a predetermined region A. The second dichroic prism 5*b* receives the light beam in the red wavelength band and the light beam in the green wavelength band, to reflect the light beam in the green wavelength band and transmit the light beam in the red wavelength band. The light beam in the green wavelength band reaches the predetermined region A. The light beam in the red wavelength band is reflected on the prism 5*c* so that the direction thereof is changed by 90°, to reach the predetermined region A.

Figure 2:
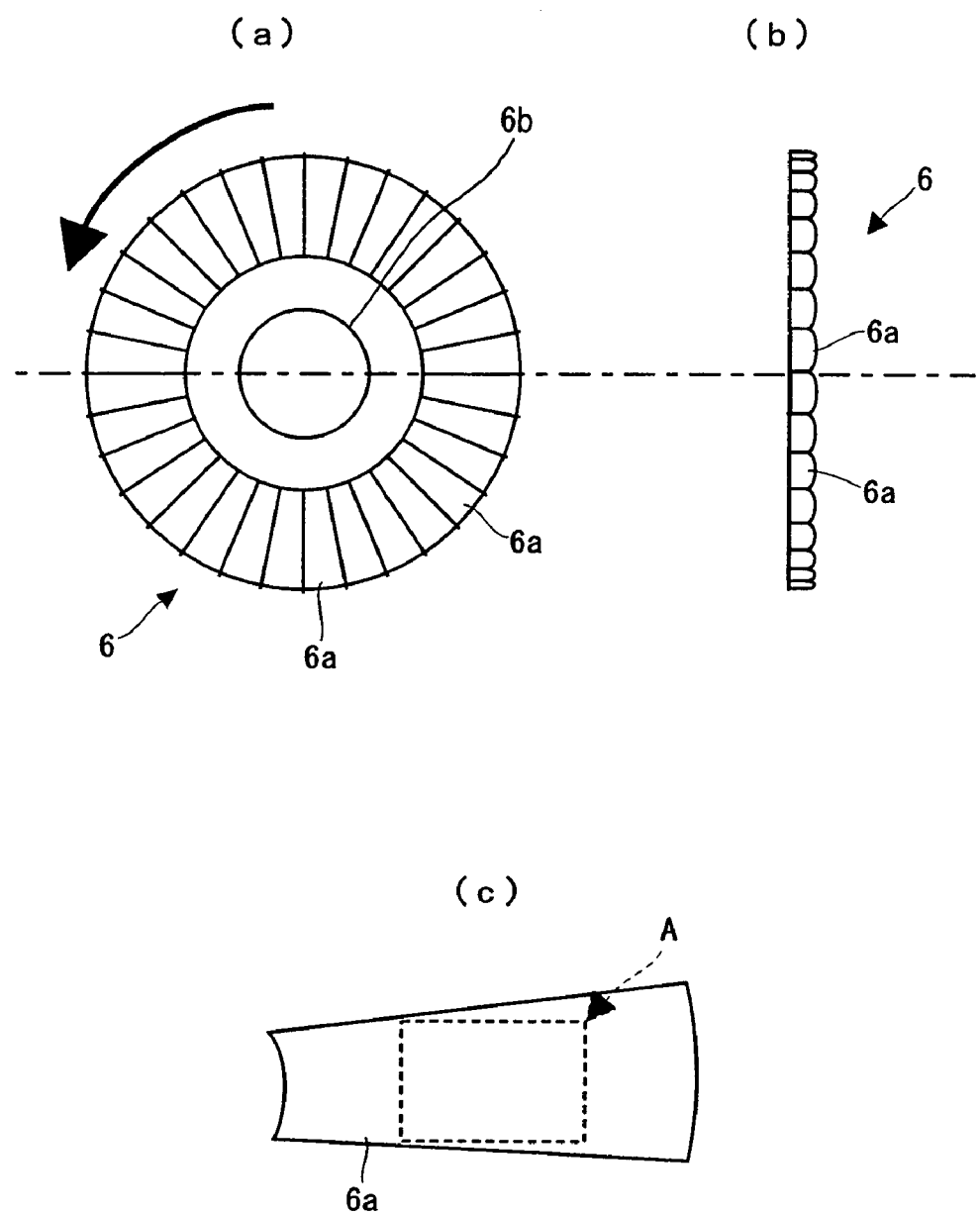
FIG. 2 is a diagram showing a lens array wheel, where

A lens array wheel 6 is provided in correspondence with the predetermined region A. The lens array wheel 6 is constructed by arranging a plurality of convex lens functional units 6*a* in a disk shape along a circumferential direction, as also illustrated in FIGS. 2(*a*) and 2(*b*). The convex lens functional unit 6*a* has a shape obtained by cutting a normal convex lens in a sector shape, as shown in FIG. 2(*c*), and has the same curvature, for example, in an upward and downward direction (in a wheel tangential direction) and in a rightward and leftward direction (in a wheel normal direction) in FIG. 2(*c*). In FIG. 2(*c*), the predetermined region A is indicated by a dotted-line frame. The R light beam, the G light beam, and the B light beam are introduced into the predetermined region A by the function of the color separator 5 to be overlapped with one another. The lens array wheel 6 is rotated in a direction indicated by an arrow in FIG. 2(*a*) by driving means 6*b* such as a motor or the like. Consequently, a plurality of convex lens functional units 6*a* circularly pass the predetermined region A.

Figure 3:
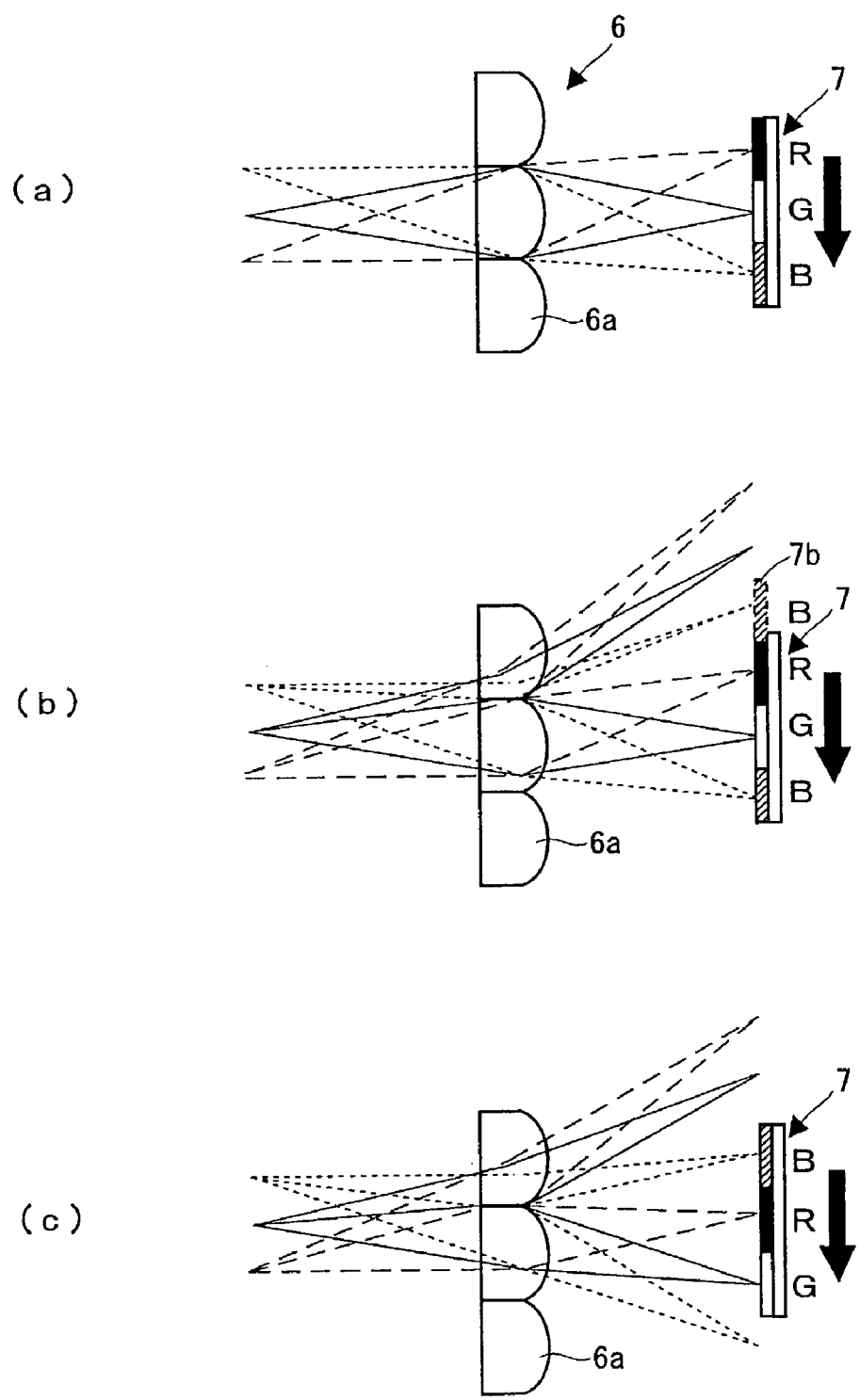
FIG. 3 is an explanatory view showing a method of introducing a light beam in each color into a liquid crystal display panel in a case where a plurality of functional units each composed of a convex lens pass through the position of a predetermined region.

FIG. 3 illustrates a method of introducing the light beam in each color into a liquid crystal display panel 7 in a case where the convex lens functional units 6*a* pass through the position of the predetermined region A. The liquid crystal display panel is constructed using a transmission type liquid crystal panel. In a state shown in FIG. 3 (*a*), the whole light in the predetermined region A is irradiated onto only one of the plurality of convex lens functional units 6*a*. In this state, the R light beam is introduced into a band region which is one-third on the upper side of the liquid crystal display panel 7, the G light beam is introduced into a band region which is one-third in the center thereof, and the B light beam is introduced into a band region which is one-third on the lower side thereof. When the convex lens functional unit 6*a* is moved slightly downward, to enter a state shown in FIG. 3 (*b*), an irradiated state where the R, G, and B light beams are shifted slightly downward while keeping the order relationship among the R, G and B colors is formed. A new B light beam, as indicated by a broken line 7*b*, reaches a part on the upper side of the liquid crystal display panel 7, and the B light region on the lower side of the liquid crystal display panel 7 is narrowed by an amount corresponding to the new B light region irradiated onto the part on the upper side of the liquid crystal display panel 7. Further, when the convex lens functional unit 6*a* is moved downward, to enter a state shown in FIG. 3 (*c*), a light received state where the R, G, and B light beams are further shifted downward while keeping the order relationship among the R, G and B colors is formed. The B, G, and R light beams are introduced in this order into the liquid crystal display panel 7. By such a function, a state where the R, G, and B band-shaped light beams are repeatedly scrolled on the liquid crystal display panel 7 by rotating the lens array wheel 6 is formed. A modulated light beam (a video light beam in each color) modulated by passing through the liquid crystal display panel 7 is projected in enlarged fashion by a projection lens (not shown), and displayed on a screen (not shown).

Figure 4:
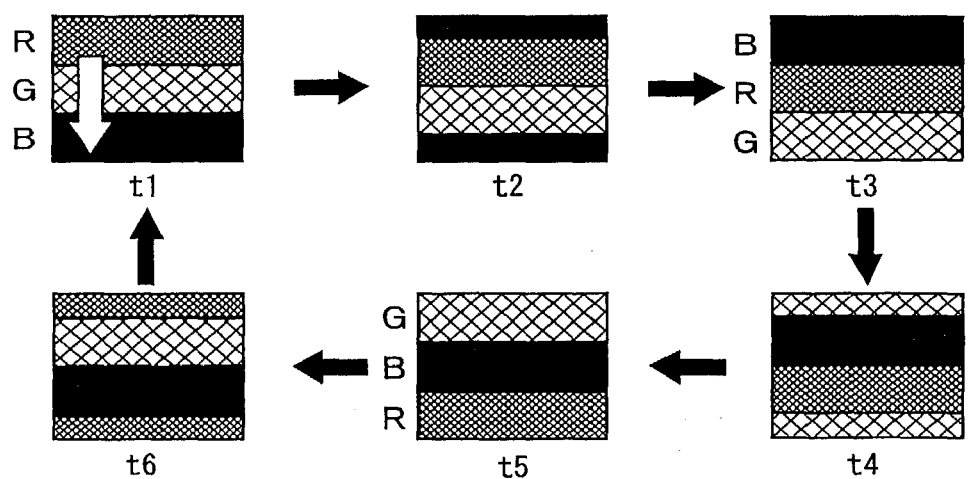
FIG. 4 is an explanatory view showing the relationship between scrolling of RGB band-shaped light beams on a liquid crystal display panel and the feed of a video signal to the liquid crystal display panel.

The lens array wheel 6 is rotated, as described above, whereby irradiated regions in the R, G, and B colors are continuously shifted through times t1 to t6, as shown in FIG. 4, on the liquid crystal display panel 7. R, G, and B color display regions of a video signal on the liquid crystal display panel 7 are changed in synchronization therewith so that the R, G, and B color regions optically irradiated by the lens array wheel 6 can always coincide with the R, G, and B color display regions on the liquid crystal display panel 7. A color video signal corresponding to one field is fed to the liquid crystal display panel 7 during t1 and t6 on the basis of a driving display mode shown in FIG. 4, thereby making color video display possible. In this system, the color video display is thus possible in construction using one liquid crystal display panel, and the three R, G, and B colors are always irradiated onto the liquid crystal display panel 7, thereby making it possible to always irradiate the white light from the lamp light source onto the liquid crystal display panel. For this purpose, video signal feed control means 8 is provided for controlling the feed of the video signal to a light bulb (liquid crystal display panel 7) in synchronization with the movement of convergent elements (convex lens functional units 6*a*) as shown in FIG. 1. Image light enlargement projection means 9 is also provided for projecting in enlarged fashion the image on the single light bulb onto a screen 10. Consequently, the light utilization efficiency which is a problem in the conventional single panel type projector can be prevented from being reduced.

Figure 5:
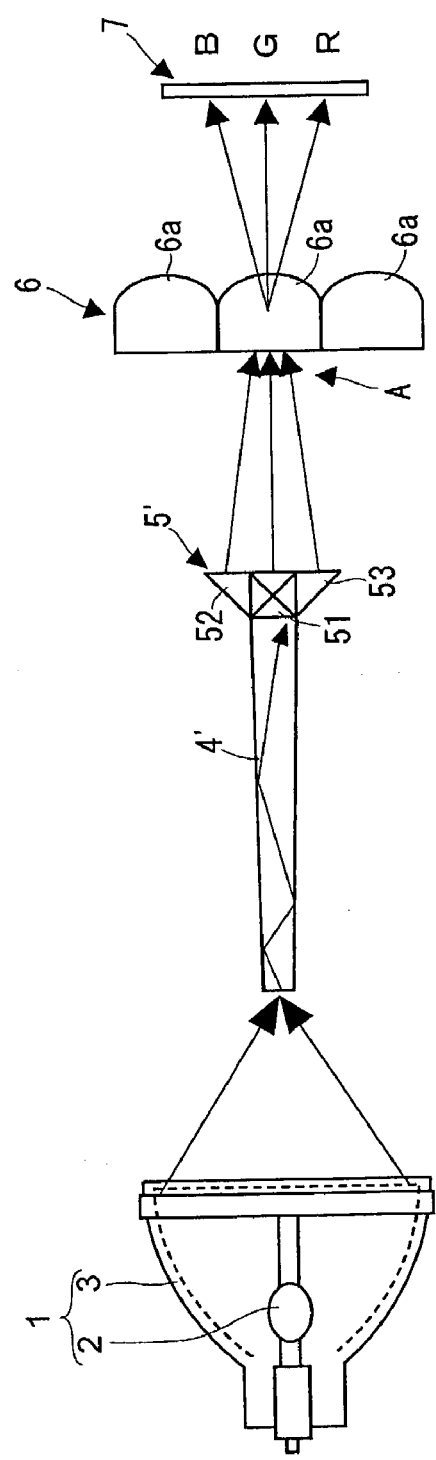
FIG. 5 is an explanatory view showing another example of a single panel type liquid crystal projector according to the embodiment of the present invention.

FIG. 5 illustrates another example of the single panel type video display. The single panel type video display comprises a rod lens 4'. The rod lens 4' has a tapered shape in which its surface on the emission side is larger than its surface on the receiving side, thereby making it possible to reduce the dispersion of emitted light as greatly as possible. The respective aspect ratios of emission surfaces of the rod lens 4', the cross prism 51, and prisms 52 and 53 having a reflection function by an aluminum coating surface are taken as 4:1 if the aspect ratio of the liquid crystal display panel 7 is 4:3 so that RGB band-shaped light beams are efficiently introduced on the liquid crystal display panel 7.

The single panel type video display shown in FIG. 5 comprises a color separator 5'. The color separator 5' comprises a cross type dichroic prism 51 and two prisms 52 and 53 having a reflection function by an aluminum coating surface provided on both sides thereof. The cross type dichroic prism 51 transmits a light beam in a green wavelength band (a G light beam) in white light received from the rod prism 4', reflects a light beam in a red wavelength band (an R light beam) to introduce the reflected light beam into the prism 52, and reflects a light beam in a blue wavelength band (a B light beam) to introduce the reflected light beam into the prism 53. The prism 52 reflects the R light beam to emit the reflected R light beam toward a predetermined region A, and the prism 53 reflects the B light beam to emit the reflected B light beam toward the predetermined region A.

A normal prism (right angled prism) has angles of 90°, 45°, and 45°, on the other hand each of the prisms 52 and 53 has angles of 90°, 46°, and 44°, for example, and is arranged such that the side of the vertical angle of 46° is the outside of the color separator 5'. The prisms 52 and 53 are slightly shifted outward from an axis connecting the center of the rod prism 4' to the center of the region A. However, the prisms 52 and 53 have the above-mentioned angles so that the R light beam and the B light beam go to the predetermined region A, thereby making it possible to further enhance the light utilization efficiency.

Although in the above-mentioned embodiment, the transmission type liquid crystal display panel is illustrated as a light valve, the present invention is not limited to the same. For example, a reflection type liquid crystal panel, a reflection type light valve for controlling and modulating a lot of micro mirrors to be pixels, or the like may be used. As band-shaped light beams in three colors constructed by the color separator, an example of an arrangement in which the G color is positioned in the middle stage, the present invention is not limited to the same. An arrangement such as "RBG·GRB" may be used. Further, there is a case where an optical member such as a condenser lens may be inserted between color separation means and a lens array wheel and between the lens array wheel and a liquid crystal panel, which is not illustrated. Further, a lens to be one component of the lens array may use not only convergence by refraction but also convergence by a diffraction function. Although in the above-mentioned embodiment, the prisms 62 and 53 have a reflection function of an angle other than 90° with respect to the optical axis of light reflected on the cross type dichroic prism 51 to introduce the light into the predetermined region A, the light can be also introduced collectively into the predetermined region A separately using an optical device by designing the prisms 52 and 53 so as to have a reflection function of 90°.

As described in the foregoing, according to the present invention, the light from the light source is changed into the band-shaped light beams in the three colors, and the light beams are simultaneously introduced into the light valve. Accordingly, the utilization efficiency of the light from the light source is improved, thereby producing the effect of increasing the luminance of the image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A single panel type video display comprising:
   color separation means for separating light from a light source into light beams in three colors in a band shape to emit the light beams and introducing the band-shaped light beams in the three colors so as to be overlapped with one another in a predetermined region; and
   movable optical means having a plurality of convergent elements of a size corresponding to said predetermined region, circularly passing the convergent elements through said predetermined region, and scrolling the band-shaped light beams in the three colors in a state where they are divided among regions on a single light bulb, wherein
   the movable optical means comprises a lens array wheel, along the circumference of which the convergent elements are arranged, the lens array wheel is configured to be rotated such that each convergent element pass through the predetermined region.

2. The single panel type video display according to claim 1, wherein
   said color separation means introduces the light passing through a rod prism provided in the position where the light from said light source is received.

3. The single panel type video display according to claim 2, wherein said rod prism has a tapered shape so as to reduce the dispersion of the light.

4. The single panel type video display according to claim 1, wherein the longitudinal length of a region into which the light is introduced on said color separation means is approximately one-third the longitudinal length of the aspect ratio of said light bulb.

5. The single panel type video display according to claim 1, wherein
   said color separation means is constructed by arranging in one direction two dichroic devices and one optical path change means.

6. The single panel type video display according to claim 1, wherein
   said color separation means comprises a cross type dichroic prism and two optical path change means.

7. The single panel type video display according to claim 6, wherein
   said two optical path change means has a reflection function of an angle other than 90 degree with respect to the optical axis of light reflected on the cross type dichroic prism to introduce the light into said predetermined region.

8. The single panel type video display according to claim 1, wherein
   the video display further comprising
   driving means for rotating the lens array wheel.

9. The single panel type video display according to claim 8, wherein
   said convergent elements each composed of the convex lens are formed in the shape of a sector which narrows toward the center and have their straight line portions brought into contact with each other.

10. A single panel type video display comprising:
    color separation means for separating light from a light source into light beams in three colors in a band shape to emit the light beams and introducing the band-shaped light beams in the three colors so as to be overlapped with one another in a predetermined region;
    movable optical means having a plurality of convergent elements of a size corresponding to said predetermined region, circularly passing the convergent elements through said predetermined region, and scrolling the band-shaped light beams in the three colors in a state where they are divided among regions on a single light bulb;
    video signal feed control means for controlling the feed of a video signal to said light bulb in synchronization with the movement of said convergent elements; and
    image light enlargement projection means for projecting in enlarged fashion the image on said single light bulb onto a screen, wherein
    the movable optical means comprises a lens array wheel, along the circumference of which the convergent elements are arranged, the lens array wheel is configured to be rotated such that each convergent element pass through the predetermined region.

* * * * *